United States Patent
Johnson et al.

(10) Patent No.: US 10,620,292 B2
(45) Date of Patent: Apr. 14, 2020

(54) METHOD FOR SELECTING SIGNALS OF OPPORTUNITY FOR PASSIVE COHERENT LOCATION

(71) Applicant: SPAWAR Systems Center Pacific, San Diego, CA (US)

(72) Inventors: Nicholas T. Johnson, San Diego, CA (US); Mohammed Chergui, San Diego, CA (US); John D. Rockway, San Diego, CA (US); Oren Sternberg, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 310 days.

(21) Appl. No.: 15/696,483

(22) Filed: Sep. 6, 2017

(65) Prior Publication Data
US 2019/0072634 A1    Mar. 7, 2019

(51) Int. Cl.
| | | |
|---|---|---|
| *G01S 1/14* | (2006.01) | |
| *G01S 1/38* | (2006.01) | |
| *G01S 19/09* | (2010.01) | |
| *G01S 5/02* | (2010.01) | |
| *G01S 13/00* | (2006.01) | |

(52) U.S. Cl.
CPC ........ *G01S 1/14* (2013.01); *G01S 1/38* (2013.01); *G01S 5/0273* (2013.01); *G01S 5/0284* (2013.01); *G01S 13/003* (2013.01); *G01S 19/09* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,251,186 A | * | 10/1993 | Lockwood | ............ G01S 15/104 367/100 |
| 5,532,700 A | * | 7/1996 | Lockwood | .......... G01S 7/52003 342/378 |
| 6,492,945 B2 | * | 12/2002 | Counselman, III | ....... G01S 5/10 342/464 |
| 6,798,381 B2 | | 9/2004 | Benner et al. | |
| 7,019,692 B2 | | 3/2006 | Baugh et al. | |
| 7,782,256 B2 | | 8/2010 | Smith | |

(Continued)

*Primary Examiner* — Mamadou L Diallo
(74) *Attorney, Agent, or Firm* — Naval Information Warfare Center, Pacific; Kyle Eppele (57) ABSTRACT

A signal evaluation system is provided for evaluating a first EM signal and a second EM signal for use in a passive coherent location system. The signal evaluation system includes: a spectrum detecting component that detects the first EM signal and the second EM signal; a signal characterization component that generates a first characterization of the first EM signal and to generate a second characterization of the second EM signal; and a ranking component that ranks the EM signals for use in the passive coherent location system. The first characterization is based on an amplitude associated with the first EM signal and one of range resolution, Doppler resolution, and combinations thereof associated with the first EM signal. The second characterization is based on an amplitude associated with the second EM signal and one of range resolution, Doppler resolution, and combinations thereof associated with the second EM signal.

19 Claims, 7 Drawing Sheets

(56) References Cited

U.S. PATENT DOCUMENTS

| | | | |
|---|---|---|---|
| 7,830,297 B1 | 11/2010 | Wang et al. | |
| 8,018,383 B1 | 9/2011 | Schantz et al. | |
| 8,373,591 B2 | 2/2013 | Margolin | |
| 9,176,231 B2* | 11/2015 | Whelan | G01S 19/34 |
| 2003/0145328 A1* | 7/2003 | Rabinowitz | G01S 5/0036 |
| | | | 725/72 |
| 2008/0062039 A1* | 3/2008 | Cohen | G01S 19/05 |
| | | | 342/357.29 |
| 2011/0210885 A1* | 9/2011 | Lodwig | G01S 7/411 |
| | | | 342/25 F |
| 2013/0050024 A1* | 2/2013 | Barott | G01S 13/003 |
| | | | 342/454 |
| 2016/0011318 A1* | 1/2016 | Cohen | G01S 19/29 |
| | | | 342/357.26 |
| 2016/0084950 A1* | 3/2016 | Muller | G01S 13/42 |
| | | | 342/36 |
| 2016/0259062 A1* | 9/2016 | Raghupathy | G01S 19/48 |
| 2017/0110015 A1* | 4/2017 | Sekelsky | B60L 53/32 |
| 2017/0234979 A1* | 8/2017 | Mathews | G01S 19/46 |
| | | | 342/357.64 |

* cited by examiner

METHOD FOR SELECTING SIGNALS OF OPPORTUNITY FOR PASSIVE COHERENT LOCATION

FEDERALLY-SPONSORED RESEARCH AND DEVELOPMENT

Method for Selecting Signals of Opportunity for Passive Coherent Location is assigned to the United States Government and is available for licensing for commercial purposes. Licensing and technical inquiries may be directed to Commanding Officer, SPAWAR Systems Center Pacific Code 36000, Office of Intellectual Property, 53510 Silvergate Avenue, San Diego, Calif. 92152-5765; voice (619) 553-5118; email ssc_pac_T2@navy.mil. Reference Navy Case Number 105,104.

BACKGROUND OF THE INVENTION

Embodiments of the invention relate to effective selection of non-cooperative signals of opportunity for passive coherent location (PCL) systems.

Radars are used in military and commercial applications to detect objects within a radar's range and to determine each object's size, location, velocity, and other physical characteristics. A traditional monostatic radar employs a co-located transmitter and receiver. A PCL system does not have its own transmitter, but uses signals of opportunity that already exist in the environment to detect and track targets. Typical signals of opportunity used by PCL systems include FM radio, digital TV, GPS, and cell phone signals.

A PCL system must evaluate and select signals of opportunity that are best suited to specific detection and tracking requirements. Prior art PCL systems select signals of opportunity based on signal amplitude. There exists a need to improve the selection of signals of opportunity used by PCL systems.

SUMMARY OF THE INVENTION

An aspect of the present invention is drawn to a signal evaluation system for evaluating a first EM signal and a second EM signal for use in a passive coherent location system. The signal evaluation system includes: a spectrum detecting component that detects the first EM signal and the second EM signal; a signal characterization component that generates a first characterization associated with the first EM signal and to generate a second characterization associated with the second EM signal; and a ranking component that ranks the first EM signal with reference to the second EM signal for use in the passive coherent location system based on the first characterization and the second characterization. The first characterization is based on an amplitude associated with the first EM signal and one of range resolution, Doppler resolution, and combinations thereof associated with the first EM signal. The second characterization is based on an amplitude associated with the second EM signal and one of range resolution, Doppler resolution, and combinations thereof associated with the second EM signal.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

The present invention provides a system and method for selecting signals of opportunity for a PCL system.

Figure 1:
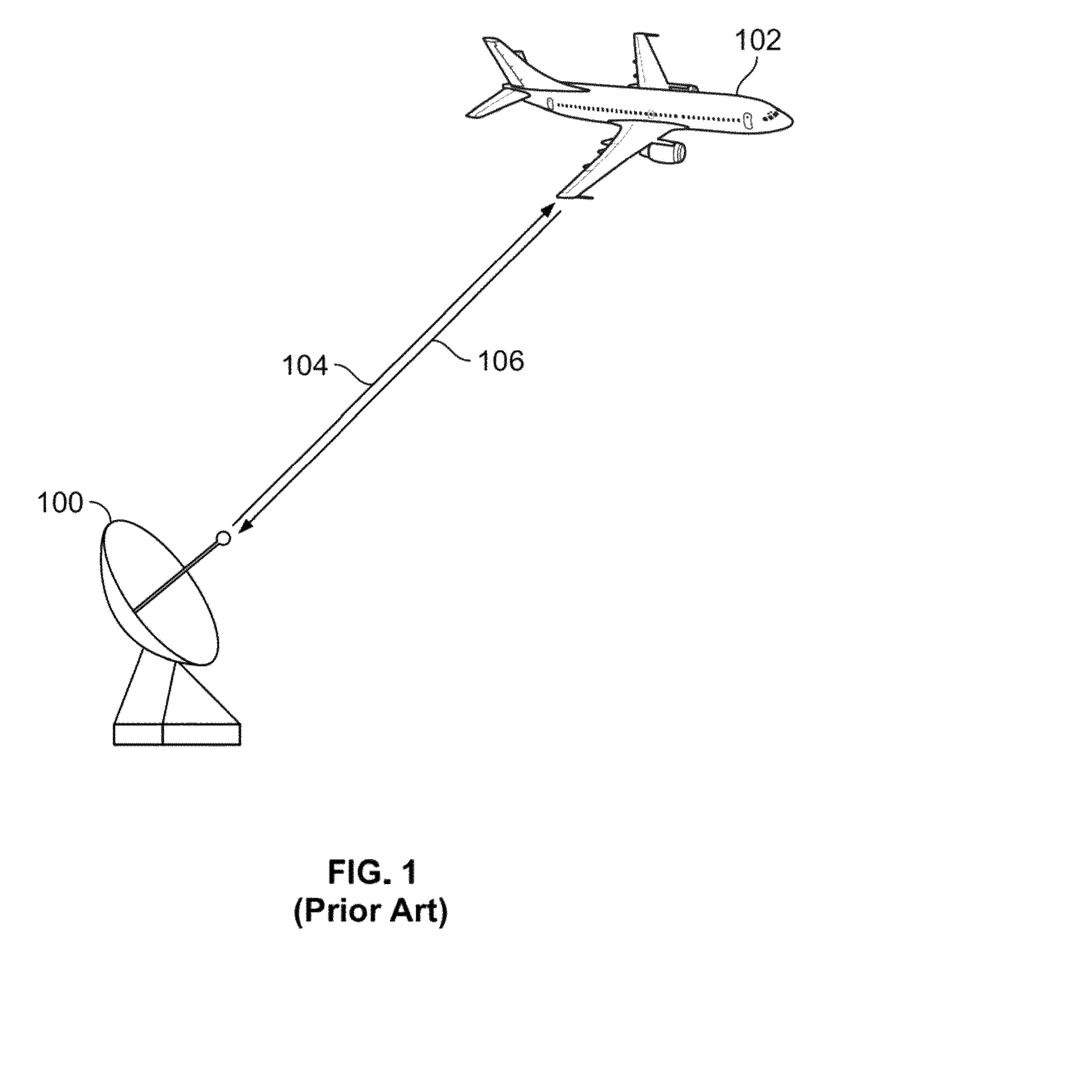
FIG. 1 illustrates a monostatic radar.

The monostatic radar generates a pulse and transmits that pulse on a carrier frequency in the radar's designated frequency band. The pulse is reflected by a target and is received by the radar's receiver. The time delay and Doppler shift in the received signal allows the radar to calculate the target's location and velocity.

A PCL system has a receiver but no transmitter of its own. Instead, it uses signals of opportunity that already exist in the environment. Typical signals of opportunity used by PCL systems include FM radio, digital TV, GPS, and cell phone signals. The PCL system must select from these various signals of opportunity a signal that is best suited to the specific mission requirement. For example, a digital TV signal may be desired for closely spaced objects due to the signal's range resolution capabilities.

Prior art PCL systems ranked signals of opportunity solely by the signals' amplitudes, but this criterion ignores other important factors such as sidelobe strength and channel interference.

A system for the effective selection of signals of opportunity for PCL systems will now be discussed with reference to FIGS. 1-6B in accordance with aspects of the present invention.

FIG. 1 illustrates a monostatic radar.

As shown in the figure, monostatic radar 100 tracks target object 102 by transmitting transmit signal 104 and receiving return signal 106.

Monostatic radar 100 is any radar device with a co-located transmitter and receiver.

Target object 102 is any object that is being detected and tracked by monostatic radar 100. In this non-limiting example, target object 102 is an airplane.

Transmit signal 104 is an electromagnetic (EM) signal generated by monostatic radar 100 with characteristics suited to the detection and tracking of target object 102.

Return signal 106 is an altered version of transmit signal 104 after being reflected by target object 102. Return signal 106 may differ from transmit signal 104 by time and Doppler shift, and other factors.

Differences between transmit signal 104 and return signal 106 allow monostatic radar 100 to calculate the location and velocity of target object 102.

The operation of a PCL system will now be discussed with reference to FIG. 2.

Figure 2:
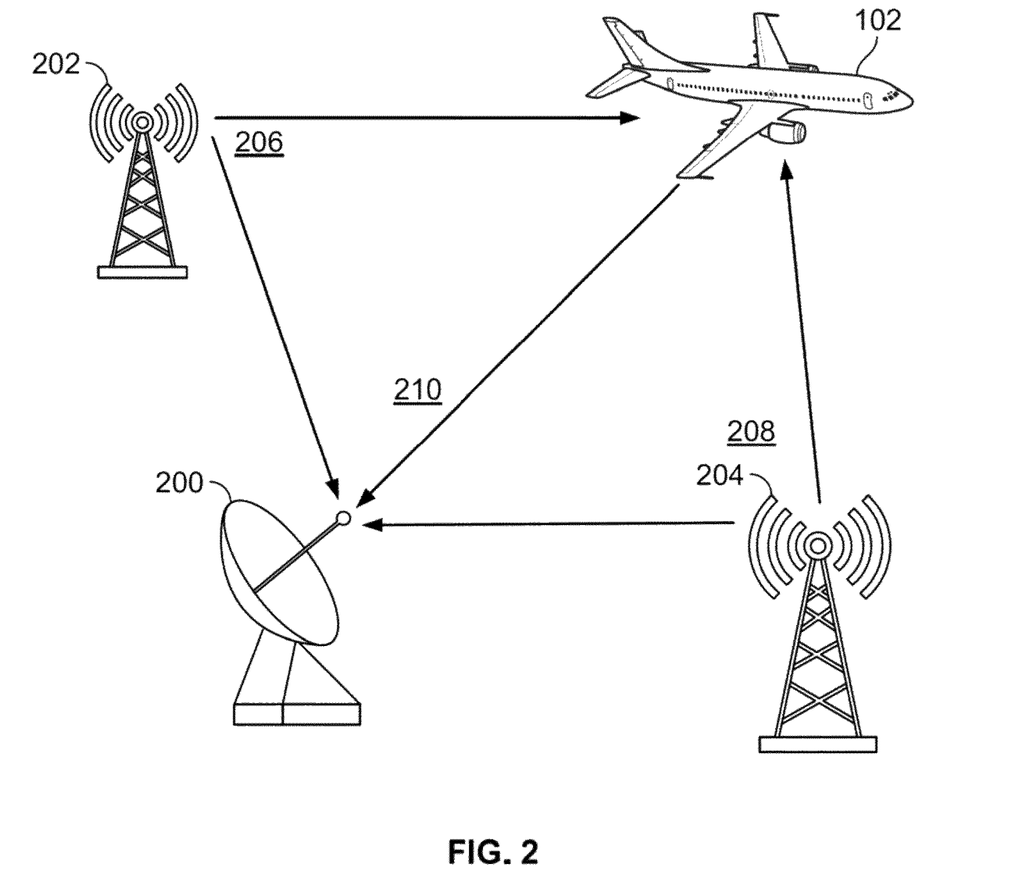
FIG. 2 illustrates a PCL system.

FIG. 2 illustrates a PCL system tracking a target object using two signals of opportunity.

As shown in the figure, transmitter 202 emits transmit signal 206 and transmitter 204 emits transmit signal 208. PCL system 200 receives transmit signal 206 and transmit signal 208. PCL system 200 also receives return signal 210 that is reflected off target object 102. Return signal 210 is the sum of the reflections of transmit signal 206 and transmit signal 208.

Though only two transmitters are shown in the figure, more than two transmitters and transmit signals may be simultaneously present.

Transmitter 202 and transmitter 204 are any sources of EM signals. Non-limiting examples of transmitter 202 and transmitter 204 are digital TV stations, FM radio stations, and cell phone towers.

PCL system 200 is any device able to track target object 102 using external signals of opportunity.

Referring to FIG. 1, monostatic radar 100 can both transmit and receive EM signals. Transmit signal 104 is designed specifically for the characteristics of monostatic radar 100 and the tasks of detecting and tracking target object 102. Returning to FIG. 2, PCL system 200 can only receive EM signals. PCL system 200 must be able to select the EM signal best suited to detecting and tracking target object 102.

Prior art PCL systems based the selection of EM signals solely on the EM signals' amplitudes. A system for effective signal selection for PCL systems that considers other signal characteristics will now be discussed with reference to FIGS. 3-6B in accordance with aspects of the present invention.

Figure 3:
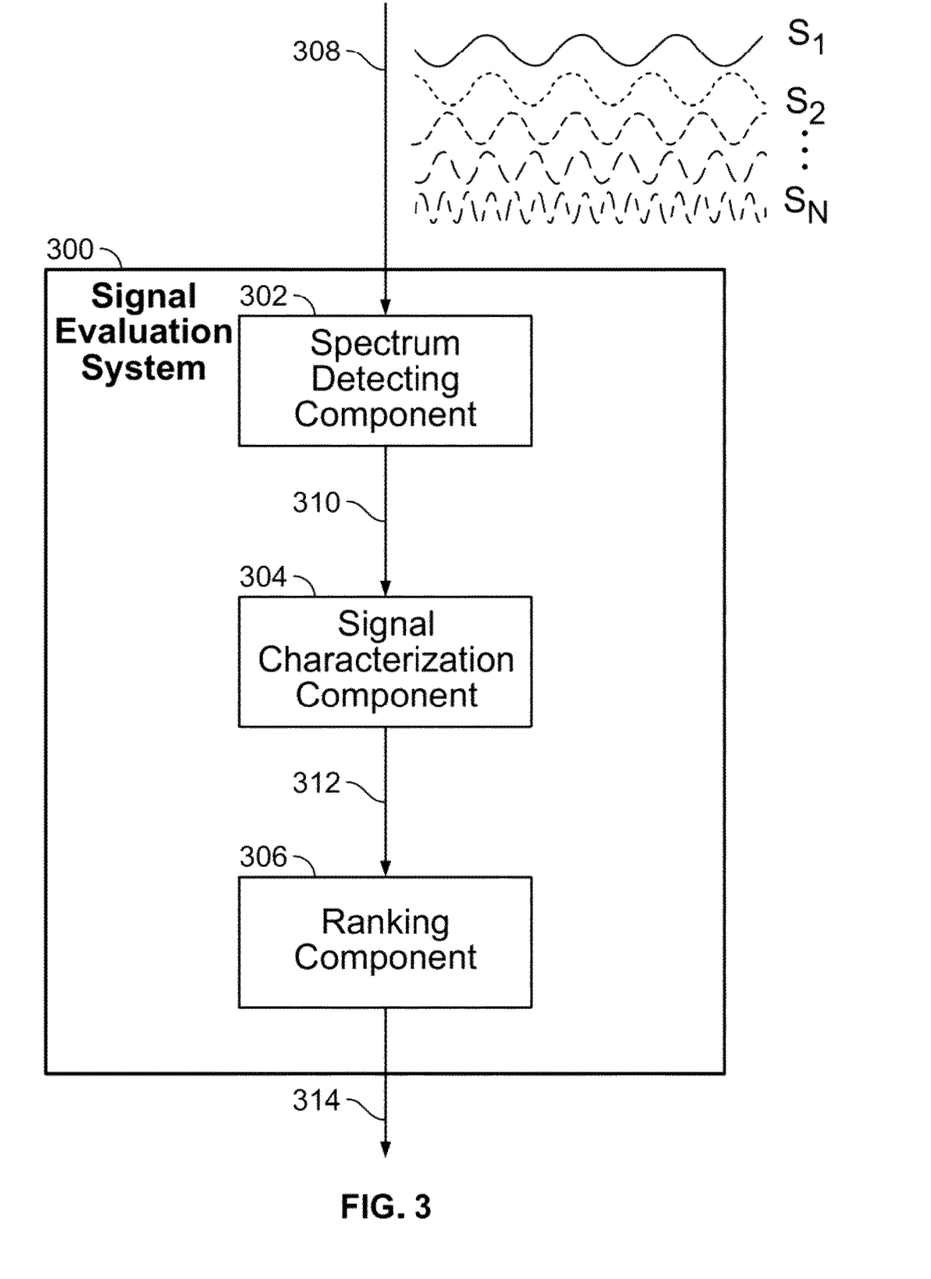
FIG. 3 illustrates a signal evaluation system in accordance with aspects of the present invention.

FIG. 3 illustrates a signal evaluation system 300 in accordance with aspects of the present invention.

As shown in the figure, signal evaluation system 300 contains a spectrum detecting component 302, a signal characterization component 304, and a ranking component 306. Signal evaluation system 300 receives EM signal 308 from the environment, extracts and analyzes specific signals, then creates ranking list 314 of signals most suited to detecting and tracking target object 102.

EM signal 308 is the sum of many individual EM signals. Referring to FIG. 2, EM signal 308 is the sum of transmit signal 206, transmit signal 208, and return signal 210. Returning to FIG. 3, EM signal 308 may be expressed as a combination of N signals $S_1, S_2, \ldots S_N$, each signal of varying frequencies and amplitudes; for the purposes of this discussion, only two individual signals need be considered.

Spectrum detecting component 302 is any device or method that extracts detected EM signal 310 from EM signal 308. In this non-limiting example, spectrum detecting component 302 extracts signals $S_1$ and $S_2$ from EM signal 308.

Signal characterization component 304 is any device or method that creates characterization 312 from detected EM signal 310. In this non-limiting example, signal characterization component 304 creates characterizations $C_1$ and $C_2$ from signals $S_1$ and $S_2$, respectively.

Ranking component 306 is any device or method that creates ranking list 314, which describes the suitability of detected EM signal 310. In this non-limiting example, ranking list 314 contains information about signals $S_1$ and $S_2$ and characterizations $C_1$ and $C_2$.

In this non-limiting example, spectrum detecting component 302, signal characterization component 304, and ranking component 306 are shown as independent components. In other example embodiments, at least two of spectrum detecting component 302, signal characterization component 304, and ranking component 306 may be combined as a unitary component. Further, in some embodiments, at least one of spectrum detecting component 302, signal characterization component 304, and ranking component 306 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Details of signal characterization component 304 will now be discussed with reference to FIG. 4 in accordance with aspects of the present invention.

Figure 4:
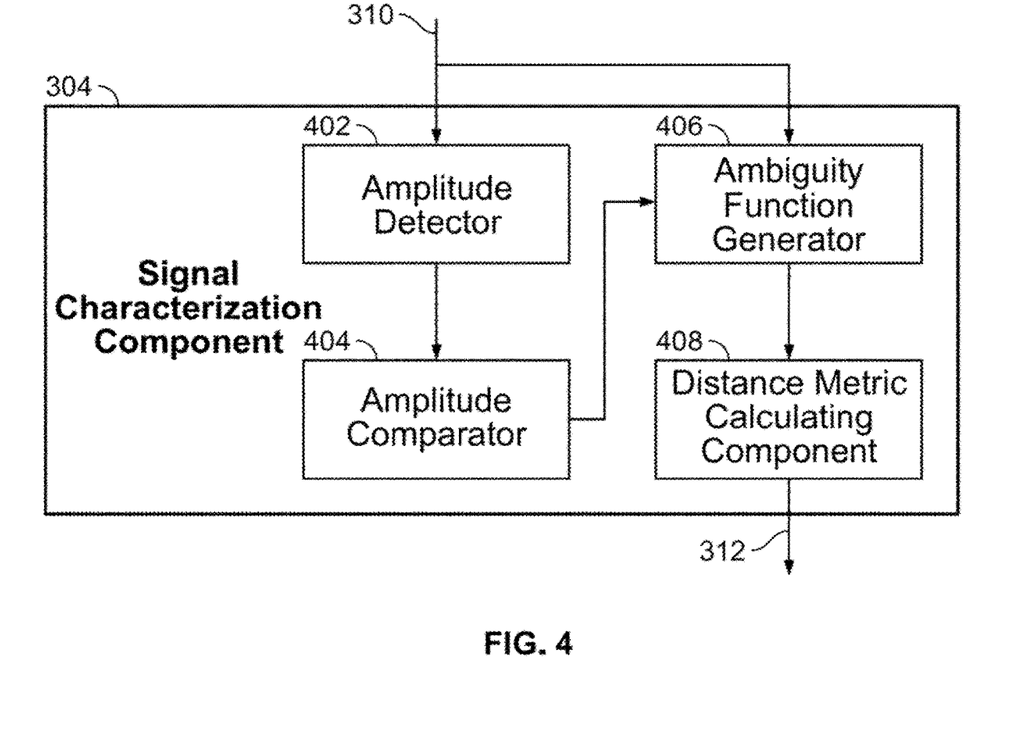
FIG. 4 illustrates a signal characterization component in accordance with aspects of the present invention.

FIG. 4 illustrates signal characterization component 304 in accordance with aspects of the present invention.

As shown in the figure, signal characterization component 304 contains an amplitude detector 402, an amplitude comparator 404, an ambiguity function generator 406, and a distance metric calculating component 408. Signal characterization component 304 receives detected EM signal 310 and outputs characterization 312.

In this non-limiting example, amplitude detector 402, amplitude comparator 404, ambiguity function generator 406, and distance metric calculating component 408 are shown as independent components. In other example embodiments, at least two of amplitude detector 402, amplitude comparator 404, ambiguity function generator 406, and distance metric calculating component 408 may be combined as a unitary component. Further, in some embodiments, at least one of amplitude detector 402, amplitude comparator 404, ambiguity function generator 406, and distance metric calculating component 408 may be implemented as a computer having tangible computer-readable media for carrying or having computer-executable instructions or data structures stored thereon.

Amplitude detector 402 is any device or method that detects a specific amplitude of detected EM signal 310. In this non-limiting example, amplitude detector 402 detects the −3 dB point of detected EM signal 310.

Amplitude comparator 404 is any device or method that compares a signal amplitude with a pre-determined threshold. In this non-limiting example, amplitude comparator 404 compares the specific amplitude of detected EM signal 310 with a pre-determined threshold. Amplitude comparator 404 rejects detected EM signal 310 if it is below the threshold.

Ambiguity function generator 406 is any device or method that uses autocorrelation to calculate an actual ambiguity function of detected EM signal 310. The ambiguity function is described by equation (1)

$$x(\tau,f) = \int_{-\infty}^{\infty} s(t) s^*(t-\tau) e^{i 2\pi f t} dt$$

where s(t) is the signal, s*(t) is its complex conjugate, z is the propagation delay, and f is the Doppler shift. For zero Doppler shift (f=0), equation (1) reduces to the autocorrelation of s(t).

From the ambiguity function, the range and Doppler resolutions and sidelobe levels of detected EM signal 310 can be observed.

Ambiguity function generator 406 also calculates an ideal ambiguity function of detected EM signal 310 by defining a cuboid function corresponding to the −3 dB points of the main lobe of the actual ambiguity function of detected EM signal 310. In this non-limiting example, the ideal ambiguity function is a cuboid with a top face of 3×3 or 4×4 samples.

Distance metric calculating component 408 is any device or method that calculates a distance metric by summing the difference between actual ambiguity function and ideal ambiguity function of detected EM signal 310 at desired sample points. The distance metric is an indication of the overall channel condition of detected EM signal 310.

In this non-limiting example, amplitude detector 402, amplitude comparator 404, ambiguity function generator 406, and distance metric calculating component 408 are shown as separate components. In other example embodiments, amplitude detector 402, amplitude comparator 404, ambiguity function generator 406, and distance metric calculating component 408 may be the same component. A non-limiting example embodiment is a digital signal processor.

Examples illustrating the operation of ambiguity function generator 406 will now be discussed with reference to FIGS. 5A-B and 6A-B in accordance with aspects of the present invention.

Figure 5A:
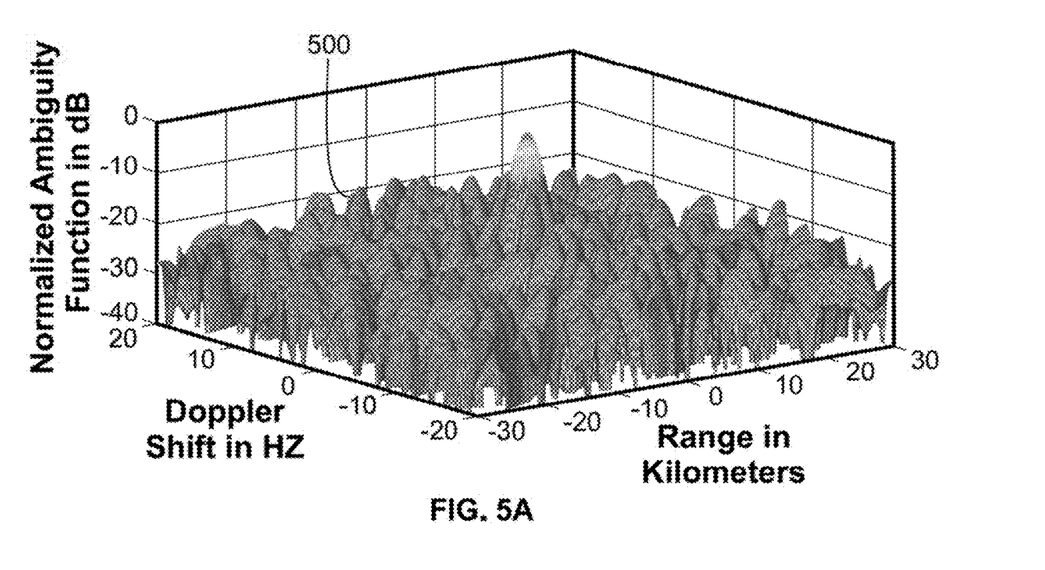
FIGS. 5A-B illustrate actual and ideal ambiguity functions for an FM signal in accordance with aspects of the present invention.
Figure 5B:
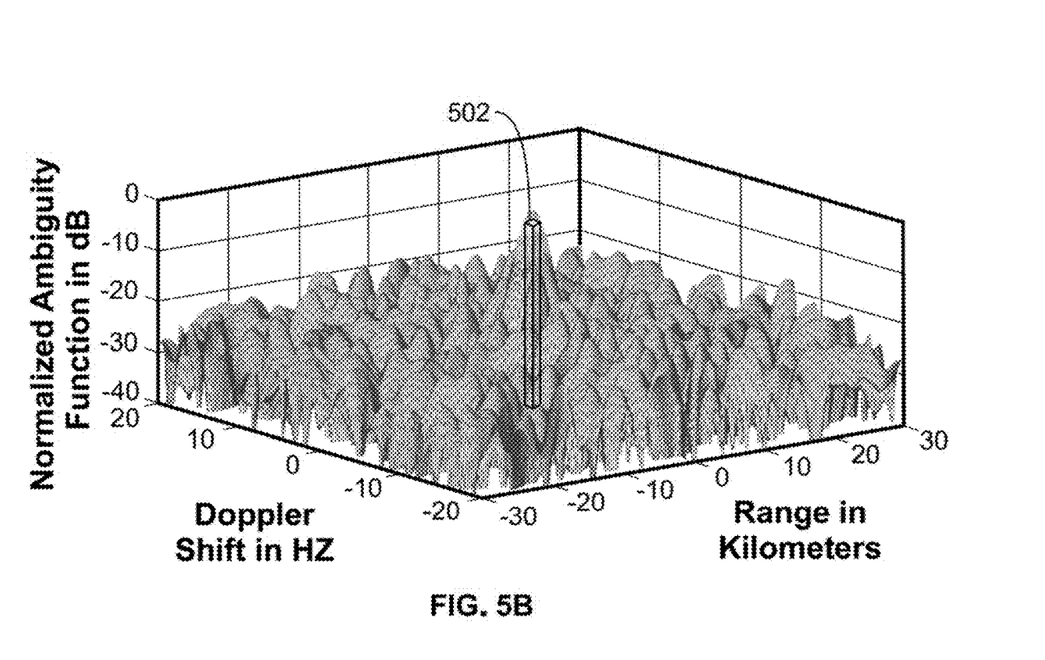

FIGS. 5A-B illustrate actual and ideal ambiguity functions, respectively, of an actual FM signal in accordance with aspects of the present invention.

As shown in the figures, actual ambiguity function 500 is a surface with a main lobe and many irregular side lobes. Ideal ambiguity function 502 is created by drawing a cuboid from the −3 dB points of the main lobe of actual ambiguity function 500.

The distance metric for actual ambiguity function 500 is calculated by summing the distances between actual ambiguity function 500 and ideal ambiguity function 502 at desired sample points.

Figure 6A:
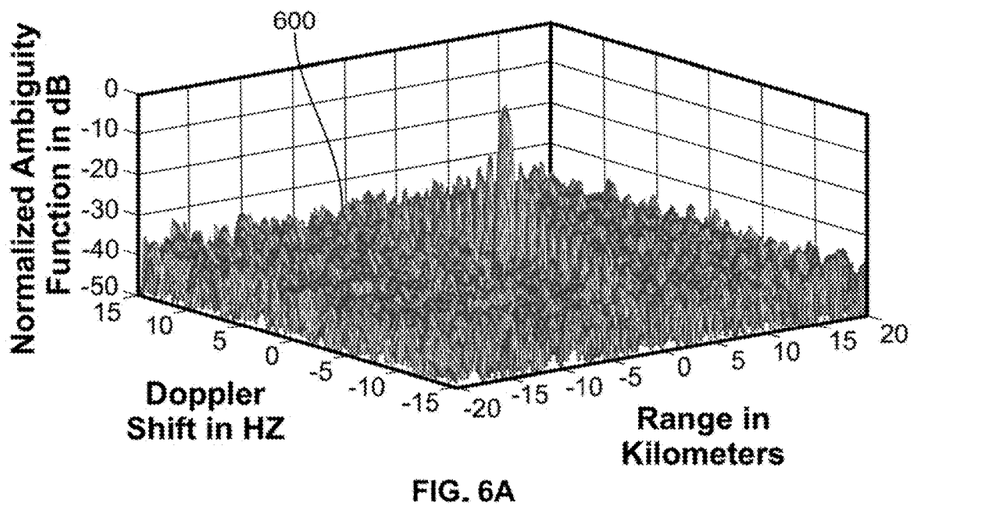
FIGS. 6A-B illustrate actual and ideal ambiguity functions for a digital TV signal in accordance with aspects of the present invention.
Figure 6B:
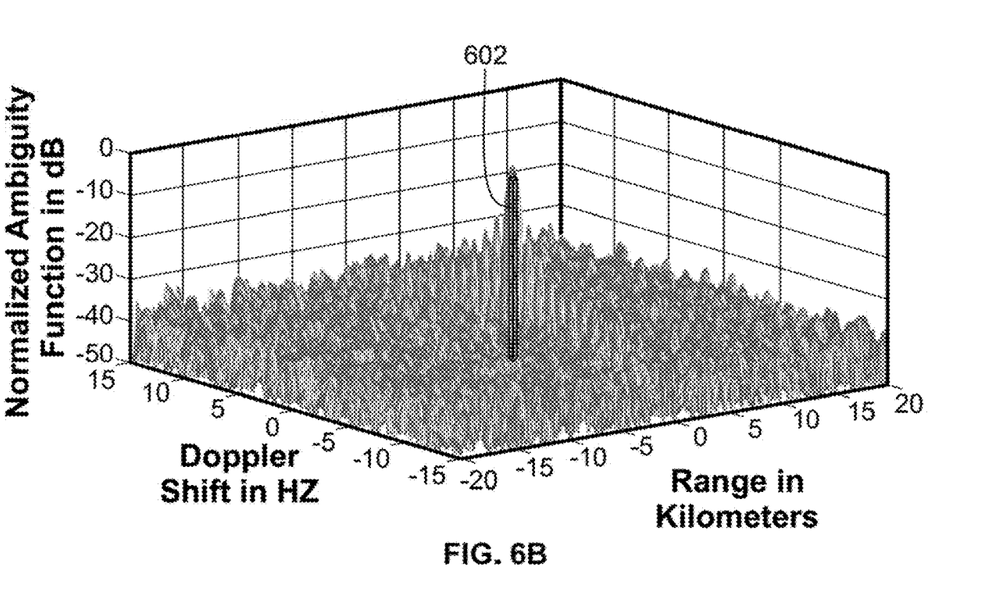

FIGS. 6A-B illustrate actual and ideal ambiguity functions, respectively, of an actual digital TV signal in accordance with aspects of the present invention.

As shown in the figures, actual ambiguity function 600 is a surface with a main lobe and many irregular side lobes. Ideal ambiguity function 602 is created by drawing a cuboid from the −3 dB points of the mainlobe of actual ambiguity function 600.

The distance metric for actual ambiguity function 600 is calculated by summing the distances between actual ambiguity function 600 and ideal ambiguity function 602 at desired sample points.

Comparing FIG. 5A and FIG. 6A, it can be observed that actual ambiguity function 500 has lower Doppler and range resolutions and higher sidelobes than actual ambiguity function 600. This indicates that the digital TV signal corresponding to actual ambiguity function 600 is better suited to resolving closely spaced targets.

Returning to FIG. 2, EM signal 308 is the sum of many signals, including transmit signal 206, transmit signal 208, and return signal 210. As shown in FIG. 3, EM signal 308 is received by signal evaluation system 300. Spectrum detecting component 302 extracts detected EM signal 310.

Signal characterization component 304 compares the amplitude of detected EM signal 310 with a pre-determined threshold; if the amplitude of detected EM signal 310 is above the threshold, then signal characterization component 304 calculates the actual and ideal ambiguity functions and a distance metric of detected EM signal 310. This information is sent as characterization 312 to ranking component 306. Spectrum detecting component 302 and signal characterization component 304 repeat the process of detecting and characterizing other signals detected in EM signal 308. Ranking component 306 creates ranking list 314 of detected EM signals and their characterizations, which can then be used to select the EM signal most suited to the requirements of detecting and tracking target object 102.

Figure 7:
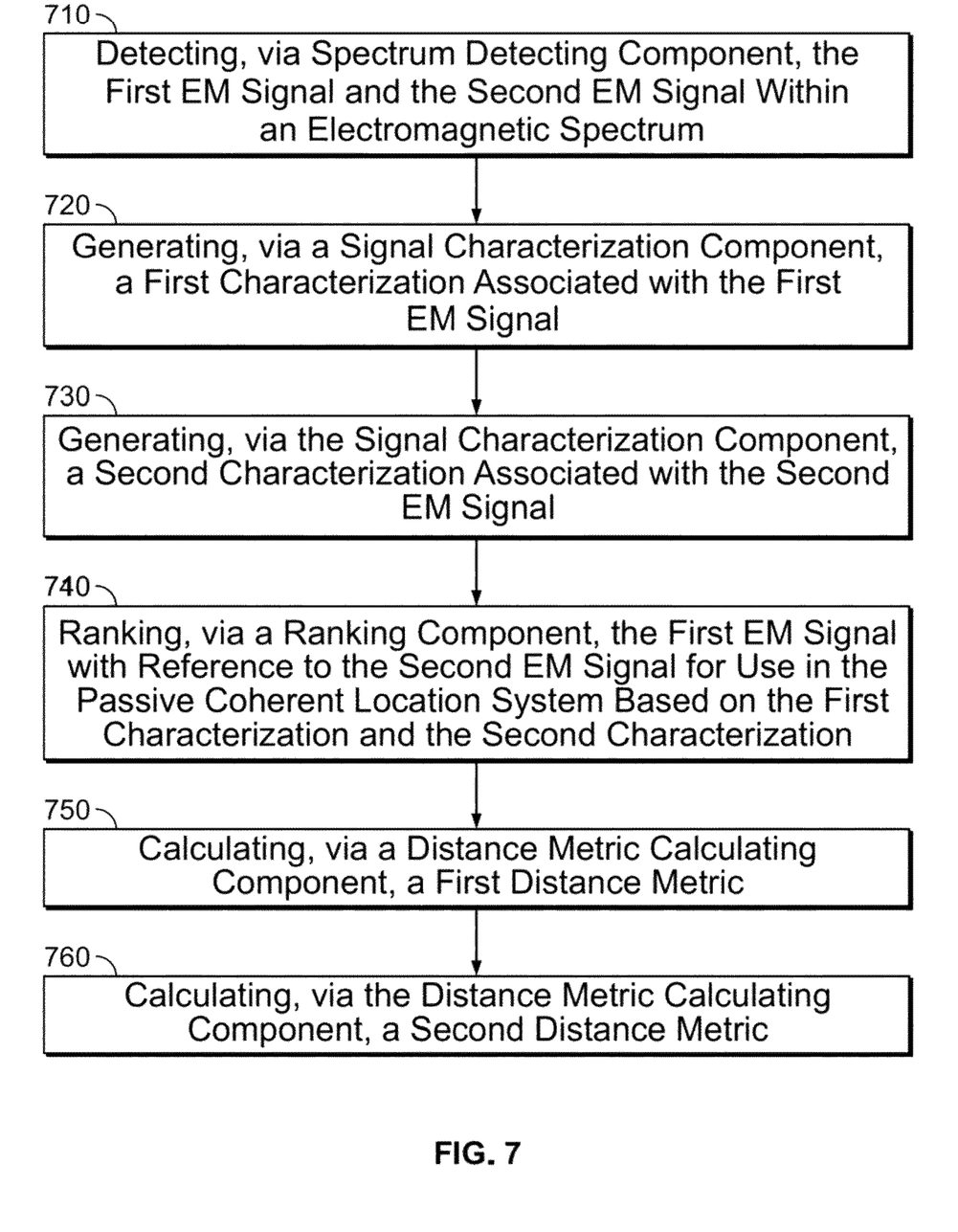
FIG. 7 is a flow chart diagram of a signal evaluation method for evaluating a first electromagnetic signal and a second electromagnetic signal for use in a passive coherent location system, in accordance with aspects of the present invention.

FIG. 7 illustrates a flow chart diagram of a signal evaluation method for evaluating a first EM signal and a second EM signal for use in a passive coherent location system, in accordance with aspects of the present invention. It should be appreciated that the steps and order of steps described and illustrated are provided as examples. Fewer, additional, or alternative steps may also be involved in the process for evaluating a first EM signal and a second EM signal for use in a passive coherent location system and/or some steps may occur in a different order.

At step 710, the method includes detecting, via spectrum detecting component 302, the first EM signal and the second EM signal within an electromagnetic spectrum. It should be noted that any number of EM signals, equal to or greater than 2, may be detected in accordance with aspects of the present invention. However, for purposes of discussion and brevity, two signals will be discussed being detected.

At step 720, the method includes generating, via signal characterization component 304, a first characterization associated with the first EM signal. At step 730, the method includes generating, via the signal characterization component, a second characterization associated with the second EM signal. Again, it should be noted that any number of EM detected signals, equal to or greater than 2, may be characterized in accordance with aspects of the present invention. However, for purposes of discussion and brevity, the two signals discussed being detected are characterized.

At step 740, the method includes ranking, via ranking component 306, the first EM signal with reference to the second EM signal for use in the passive coherent location system based on the first characterization and the second characterization. Again, it should be noted that all EM detected signals, equal to or greater than 2, may be ranked in accordance with aspects of the present invention. However, for purposes of discussion and brevity, the two signals discussed being detected are ranked.

At step 750, the method includes calculating, via distance metric calculating component 408, a first distance metric. At step 760, the method includes calculating, via distance metric calculating component 408, a second distance metric. Again, it should be noted that any number of EM detected signals, equal to or greater than 2, may have a distance metric calculated in accordance with aspects of the present invention. However, for purposes of discussion and brevity, the two signals discussed being detected have a respective distance metric calculated.

In summary, PCL systems use signals of opportunity to detect and track target objects in the environment. Prior art PCL systems selected signals solely on the basis of signal amplitude, without regard to other factors such as sidelobe strength and channel interference. This may lead to the use of signals that are not necessarily suitable to the detection task; for example, a strong FM radio signal may be selected by prior art PCL systems even though a weaker digital TV signal is more suitable due to its lower sidelobes and more prominent mainlobe.

The invention presents a system and method for improving the selection of signals of opportunity in PCL systems. This invention generates and evaluates the ambiguity function of each signal in real-time, and allows the PCL system to estimate signal parameters such as resolution in range and Doppler, sidelobe presence, and channel interference. These characterizations improve the ability to select a signal most suited to the target detection and tracking requirements.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A signal evaluation system for evaluating a first EM signal and a second EM signal for use in a passive coherent location system, said signal evaluation system comprising:
spectrum detecting component operable to detect the first EM signal and the second EM signal within an electromagnetic spectrum;
a signal characterization component operable to generate a first characterization associated with the first EM signal and to generate a second characterization associated with the second EM signal; and
a ranking component operable to rank the first EM signal with reference to the second EM signal for use in the passive coherent location system based on the first characterization and the second characterization,
wherein the first characterization is based on an amplitude associated with the first EM signal and one of range resolution, Doppler resolution, and combinations thereof associated with the first EM signal, and
wherein the second characterization is based on an amplitude associated with the second EM signal and one of range resolution, Doppler resolution, and combinations thereof associated with the second EM signal.

2. The signal evaluation system of claim 1,
wherein said signal characterization component comprises an amplitude detector and an amplitude comparator,
wherein said amplitude detector is operable to detect a first amplitude associated with the first EM signal and to detect a second amplitude associated with the second EM signal,
wherein said amplitude comparator is operable to generate a first amplitude comparison based on the first amplitude and a predetermined amplitude threshold and to generate a second amplitude comparison based on the second amplitude and the predetermined amplitude threshold.

3. The signal evaluation system of claim 2, wherein signal characterization component comprises an ambiguity function generator operable to generate a first ambiguity function associated with the first EM signal and to generate a second ambiguity function associated with the second EM signal.

4. The signal evaluation system of claim 3, wherein said ambiguity function generator further comprises an autocorrelator operable to autocorrelate the first EM signal and to autocorrelate the second EM signal.

5. The signal evaluation system of claim 4, wherein said ambiguity function generator is further operable to generate a first ideal ambiguity function associated with the first EM signal and to generate a second ideal ambiguity function associated with the second EM signal.

6. The signal evaluation system of claim 5,
wherein said ambiguity function generator is further operable to generate a first ideal ambiguity function associated with the first EM signal and to generate a second ideal ambiguity function associated with the second EM signal,
wherein the first ideal ambiguity function represents perfect autocorrelation of the first EM signal, and
wherein the second ideal ambiguity function represents perfect autocorrelation of the second EM signal.

7. The signal evaluation system of claim 6, further comprising:
a distance metric calculating component operable to calculate a first distance metric and a second distance metric,
wherein the first distance metric is based on a relationship between the first ambiguity function and the first ideal ambiguity function, and
wherein the second distance metric is based on a relationship between the second ambiguity function and the second ideal ambiguity function.

8. The signal evaluation system of claim 7,
wherein the first distance metric comprises a difference between the first ambiguity function and the first ideal ambiguity function, and
wherein the second distance metric comprises a difference between the second ambiguity function and the second ideal ambiguity function.

9. The signal evaluation system of claim 1, wherein said signal characterization component comprises an ambiguity function generator operable to generate a first ambiguity function associated with the first EM signal and to generate a second ambiguity function associated with the second EM signal.

10. The signal evaluation system of claim 9, wherein said ambiguity function generator further comprises an autocorrelator operable to autocorrelate the first EM signal with itself and to autocorrelate the second EM signal.

11. The signal evaluation system of claim 10, wherein said ambiguity function generator is further operable to generate a first ideal ambiguity function associated with the first EM signal and to generate a second ideal ambiguity function associated with the second EM signal.

12. The signal evaluation system of claim 11,
wherein said ambiguity function generator is further operable to generate a first ideal ambiguity function associated with the first EM signal and to generate a second ideal ambiguity function associated with the second EM signal,
wherein the first ideal ambiguity function represents perfect autocorrelation of the first EM signal, and
wherein the second ideal ambiguity function represents perfect autocorrelation of the second EM signal.

13. The signal evaluation system of claim 12, further comprising:
a distance metric calculating component operable to calculate a first distance metric and a second distance metric, wherein the first distance metric is based on a relationship between the first ambiguity function and the first ideal ambiguity function, and wherein the second distance metric is based on a relationship between the second ambiguity function and the second ideal ambiguity function.

14. The signal evaluation system of claim 13, wherein the first distance metric comprises a difference between the first ambiguity function and the first ideal ambiguity function, and wherein the second distance metric comprises a difference between the second ambiguity function and the second ideal ambiguity function.

15. A signal evaluation method for evaluating a first EM signal and a second EM signal for use in a passive coherent location system, said signal evaluation method comprising:

detecting, via spectrum detecting component, the first EM signal and the second EM signal within an electromagnetic spectrum;

generating, via a signal characterization component, a first characterization associated with the first EM signal;

generating, via the signal characterization component, a second characterization associated with the second EM signal; and ranking, via a ranking component, the first EM signal with reference to the second EM signal for use in the passive coherent location system based on the first characterization and the second characterization, wherein the first characterization is based on an amplitude associated with the first EM signal and one of range resolution, Doppler resolution, and combinations thereof associated with the first EM signal, and wherein the second characterization is based on an amplitude associated with the second EM signal and one of range resolution, Doppler resolution, and combinations thereof associated with the second EM signal.

16. The signal evaluation method of claim 15, wherein said generating, via a signal characterization component, a first characterization associated with the first EM signal comprises detecting, via an amplitude detector a first amplitude associated with the first EM signal, wherein said generating, via the signal characterization component, a second characterization associated with the second EM signal comprises detecting, via the amplitude detector, a second amplitude associated with the second EM signal, wherein said generating, via a signal characterization component, a first characterization associated with the first EM signal further comprises generating, via an amplitude comparator, a first amplitude comparison based on the first amplitude and a predetermined amplitude threshold, and wherein said generating, via the signal characterization component, a second characterization associated with the second EM signal further comprises generating, via the amplitude comparator, a second amplitude comparison based on the second amplitude and the predetermined amplitude threshold.

17. The signal evaluation method of claim 16, wherein said generating, via a signal characterization component, a first characterization associated with the first EM signal further comprises generating, via an ambiguity function generator, a first ideal ambiguity function associated with the first EM signal, and wherein said generating, via the signal characterization component, a second characterization associated with the second EM signal further comprises generating, via the ambiguity function generator, a second ideal ambiguity function associated with the second EM signal.

18. The signal evaluation method of claim 17, wherein said generating, via an ambiguity function generator, a first ideal ambiguity function comprises autocorrelating, via an autocorrelator, the first ambiguity function associated with the first EM signal, and wherein generating, via the ambiguity function generator, a second ideal ambiguity function comprises autocorrelating, via an autocorrelator, the second ambiguity function associated with the second EM signal.

19. The signal evaluation method of claim 18, further comprising:

calculating, via a distance metric calculating component, a first distance metric; and calculating, via the distance metric calculating component, a second distance metric, wherein the first distance metric is based on a relationship between the first ambiguity function and the first ideal ambiguity function, and wherein the second distance metric is based on a relationship between the second ambiguity function and the second ideal ambiguity function.

\* \* \* \* \*